(12) United States Patent
Guillot

(10) Patent No.: US 9,545,704 B2
(45) Date of Patent: Jan. 17, 2017

(54) THROUGH CUTTING MILL STEADY REST

(71) Applicant: Glenn Guillot, Lafayette, LA (US)

(72) Inventor: Glenn Guillot, Lafayette, LA (US)

( * ) Notice: Subject to any disclaimer, the term of this patent is extended or adjusted under 35 U.S.C. 154(b) by 176 days.

(21) Appl. No.: 14/298,631

(22) Filed: Jun. 6, 2014

(65) Prior Publication Data
US 2015/0352677 A1 Dec. 10, 2015

(51) Int. Cl.
*B23Q 3/06* (2006.01)
*B25B 1/24* (2006.01)
*B25B 5/04* (2006.01)
*B25B 1/20* (2006.01)
*B23Q 1/76* (2006.01)

(52) U.S. Cl.
CPC . *B25B 5/04* (2013.01); *B23Q 1/76* (2013.01); *B25B 1/20* (2013.01); *B25B 1/2442* (2013.01); *B25B 1/2463* (2013.01); *Y10T 29/49996* (2015.01); *Y10T 29/49998* (2015.01); *Y10T 409/309016* (2015.01)

(58) Field of Classification Search
CPC ............ B25B 5/04; B25B 1/2463; B25B 1/20; B25B 1/2442; B23Q 1/76; Y10T 29/49998; Y10T 409/309016; Y10T 29/49996
See application file for complete search history.

(56) References Cited

U.S. PATENT DOCUMENTS

| | | | |
|---|---|---|---|
| 2,847,204 A | 8/1958 | Menser et al. | |
| 2,955,819 A * | 10/1960 | Church | B25H 1/00 269/146 |
| 3,071,269 A * | 1/1963 | Moulds, Jr. | B65D 19/44 108/55.3 |
| 3,456,536 A | 7/1969 | Daniels | |
| 4,221,269 A * | 9/1980 | Hudson | E21B 19/168 173/222 |
| 5,443,246 A * | 8/1995 | Peterson | B25B 5/068 269/166 |
| 5,934,626 A | 8/1999 | Collins, Jr. | |
| 6,189,878 B1 | 2/2001 | Meese | |
| 7,255,336 B2 | 8/2007 | Sukawa | |
| 8,474,806 B2 * | 7/2013 | Orgeron | B25B 5/061 269/218 |
| 8,505,892 B2 | 8/2013 | Seidel | |
| 8,567,039 B2 | 10/2013 | Neumaier et al. | |

* cited by examiner

*Primary Examiner* — John C Hong

(57) ABSTRACT

An apparatus and method for a through cutting machining steady rest comprising a base plate fixed to a vertical support plate where an adjustable workpiece cradle may be adjusted to support a desired workpiece to be machined. A pair of opposing articulating side arms pivotally mounted upon the vertical plate wherein articulation of a fastening means will clampingly engage the side arms upon the desired workpiece. The side arms are engaged at points leaving a gap between the side arms for machining of the workpiece between the side arms. Rollers are implemented upon the ends of the side arms and along the came of the workpiece cradle to allow for a fixed axial hold of the workpiece while allowing the workpiece to be rotated around its longitudinal axis for further machining without the need of unclamping and repositioning the workpiece on the steady rest.

17 Claims, 7 Drawing Sheets

THROUGH CUTTING MILL STEADY REST

FIELD OF INVENTION

This invention relates to a workpiece gripping apparatus for cutting or machining. More particularly, the application relates to an apparatus for fixedly gripping a workpiece in a position for machining wherein the drilling or machining tool may machine the workpiece without the need to reposition the workpiece. The apparatus includes rollers equipped upon a workpiece cradle and articulating side arms to allow positioning of the workpiece for machining while allowing for machining between the arms without causing damage to the apparatus.

BACKGROUND OF THE INVENTION

Machining is a process whereby a piece of material is cut into a desired final shape and size by a controlled material removal process. In traditional machining processes, machining took, such as lathes, milling machines, drill press, or others are used with sharp cutting tools to remove material to achieve a desired shape. Machining requires attention to many details for a workpiece to meet the specifications set out in the engineering drawings or blueprints. There is a present problem in achieving the correct finish or surface smoothness on a machined workpiece as poor surface finish, evident by an undulating, or irregular finish or the appearance of waves on the machined surfaces of the workpiece, is caused by incorrect clamping of a workpiece.

With typical workpiece clamping devices, a bar or chain is implemented above the workpiece to grip and hold it in place for machining. Use of such a bar or chain prevents machining tools from machining the workpiece at the contact point of the gripping device, requiring the gripping device to be released, the workpiece moved, and the gripping device to be reattached before the workpiece can be further machined. Releasing and repositioning of the workpiece can lead to inaccuracy of machining.

Further, with typical machining devices, the contact of machining tools will cause the workpiece to shift away from the pressure of the tool. An example of such a case being when a drilling, or machining tool is brought from above to contact a workpiece wherein the pressure from the drill or machining tool will deflect the workpiece away from the clamping means allowing it to shift. Such movement causes inaccurate machining, poor surface finish on the machined piece, and an increased cost in producing a machined workpiece.

Another disadvantage of typical workpiece clamping devices is that machining may only take place upon the upper surfaces of the workpiece. Attempting to machine completely through a workpiece risks damage to the steady rest which the workpiece is positioned upon.

SUMMARY OF THE INVENTION

The present invention provides a through-cutting steady rest for clampingly holding a workpiece of any size in place where the workpiece may be held vertically or horizontally to be milled, machined, or drilled between the clamping arms without causing damage to the steady rest. The steady rest comprises pivotal side arms attached to a vertical plate and base plate wherein a cradle attached to the vertical plate may be adjusted to fit a workpiece of any size. Rollers are equipped upon the pivotal side arms and cradle to allow for rotation of the workpiece around its longitudinal axis while preventing axial movement of the workpiece during the machining process. Due to the orientation of the cradle and arms around the piece, the problem of shifting away experienced with typical workpiece steady rests will be prevented.

Anchors fixedly attached to the upper surface of the vertical plate will allow for clamping force to be created by an articulating means. The articulating means will be pivotally attached to the anchors and the side arms wherein as the clamping pressure is created and the side arms are pivoted inward, the pivoted connection of the articulating means will allow for constant perpendicular force to be apply by the articulating means upon the side arms to generate clamping engagement with the desired workpiece to be machined.

As the side arms will engage a workpiece upon the upper sides of the workpiece with the perpendicular force of the articulating means providing a downward pressure upon the workpiece against the cradle, a bar or chain will no longer be required to provide retaining pressure upon the workpiece to keep it in place on the steady rest. Thus the opening created between the pivoting side arms will permit a machining tool to machine a workpiece between the arms of the steady rest without causing damage to the steady rest or reducing the quality of the machining work done.

Further, the rollers disposed along the curved cradle along with the side clamping nature of the side arms will provide a fixed hold upon the workpiece to be machined where the pressure exerted upon the workpiece by the machining tool will not cause the workpiece to shift away from the pressure. In this manner pressure may be exerted by a machining, tool in alternate directions upon the workpiece with no workpiece shifting or movement.

Another advantage of the present steady rest is that a gap is created between the workpiece and the curved surface of the workpiece cradle. A decline at the bottom surface of the workpiece cradle will allow a machining tool to machine completely through the workpiece while minimizing or eliminating the risk of contacting the cradle with the machining tool and causing damage to the steady rest.

DESCRIPTION OF EMBODIMENT

Figure 1:
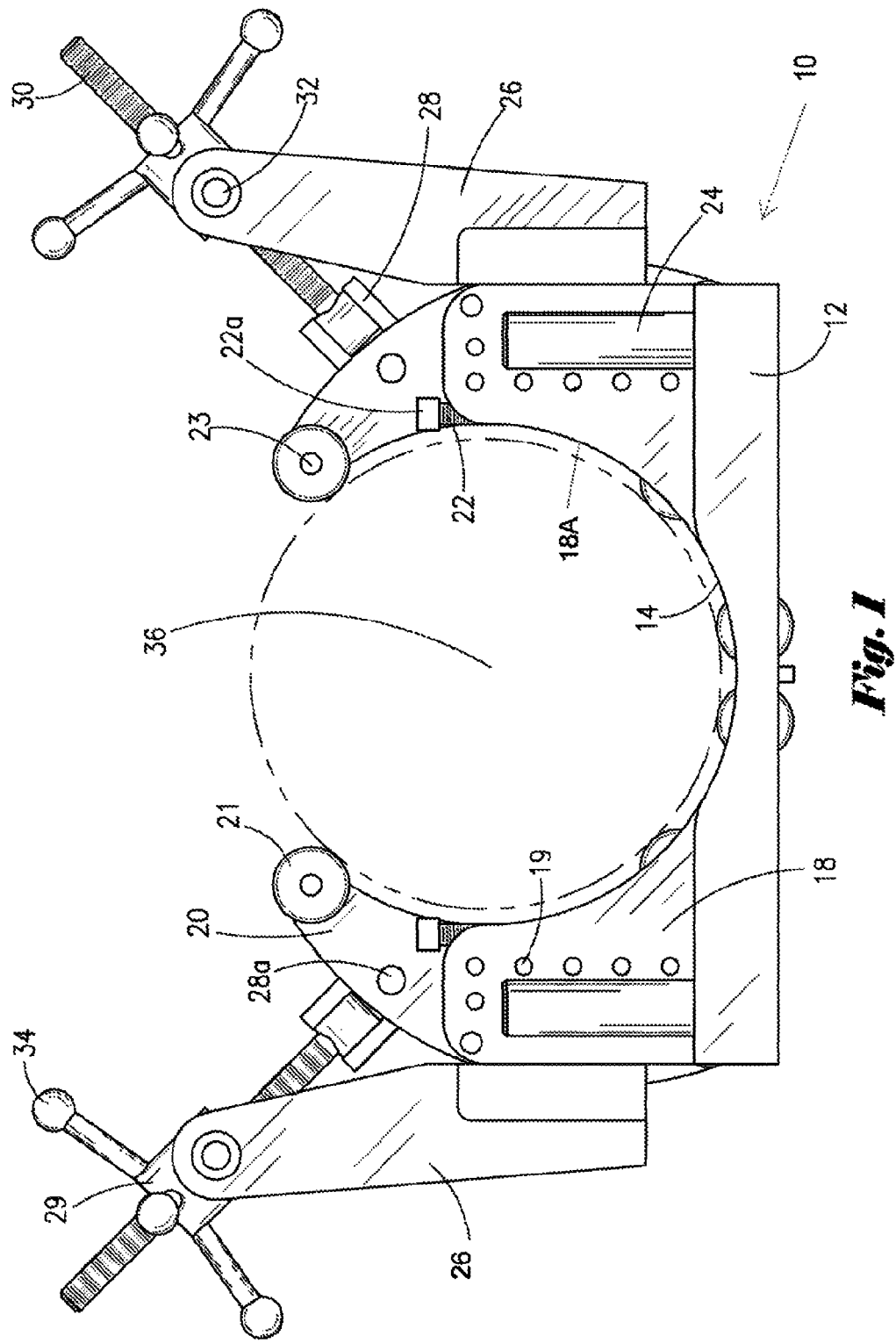
FIG. 1 is a front elevation view of the through cutting mill steady rest as described herein depicting the base plate side.
Figure 2:
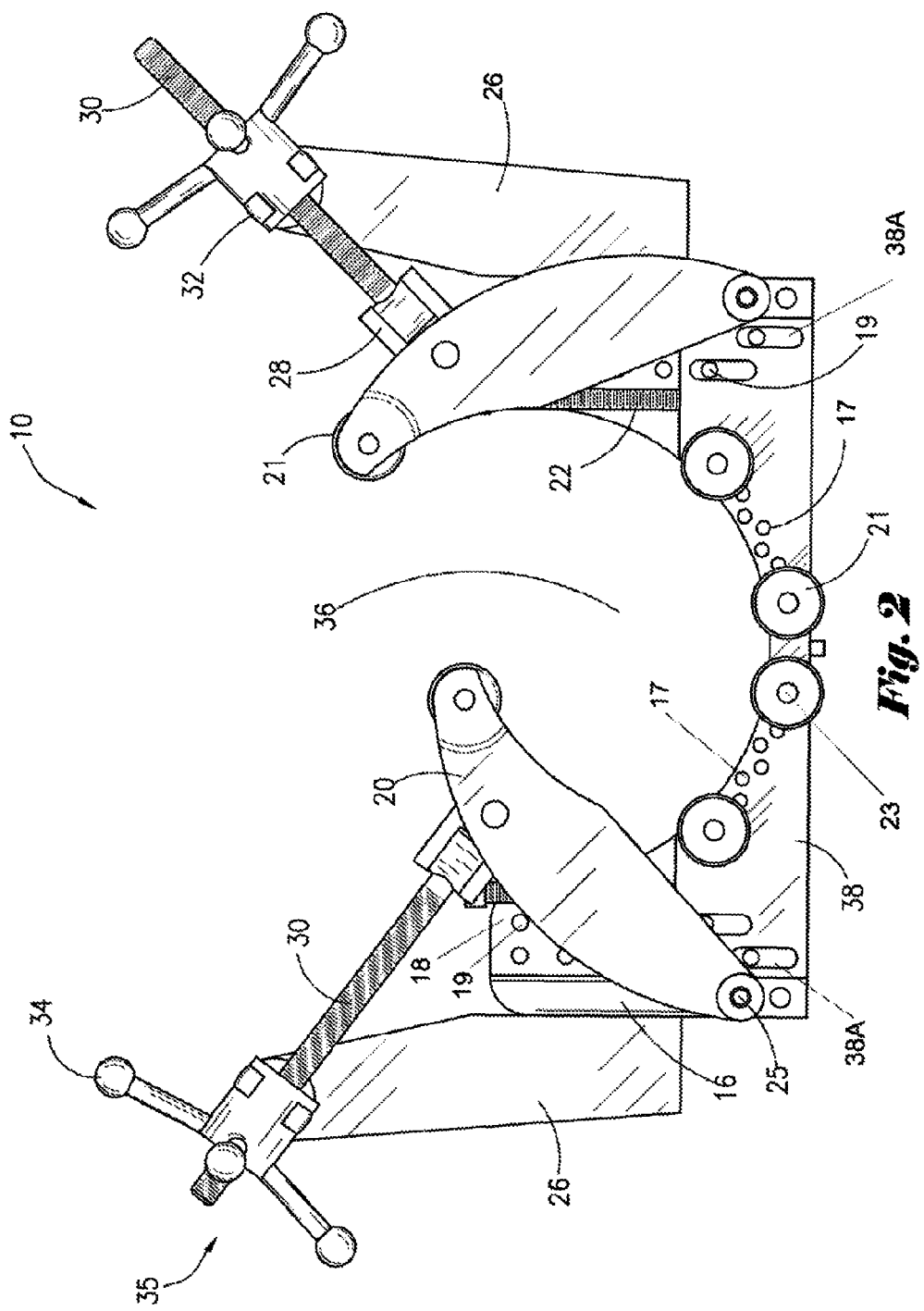
FIG. 2 is a rear elevation view of the through cutting mill steady rest as shown in FIG. 1 depicting, the cradle side.

Referring to the drawings the mill through steady rest apparatus 10 of the present invention is shown. The apparatus 10 includes a base plate 12 that supports a vertical support plate 18 to create an L-shaped frame. The vertical support plate 18 supports a pair of clamping articulable arms 20 and a vertically positionable workpiece cradle 38 to create an aperture or opening 36 around a workpiece.

Base plate 12 is has a curved seat 14 which assists in support of a large workpiece to be machined. Vertical support plate 18 has a curved support surface 18A corresponding to the curvature of the curved seat 14 of base plate 12. The vertical support plate 18 has a pair of vertical slide supports 16 projecting perpendicularly outward from vertical support plate 18. Cradle 38 is slidably positioned between and supported by supports 16. Cradle 38 has a curved support surface 43 that may be configured to correspond with the curvature of the curved seat 14 of base plate 12 and the curved support surface 18A of support plate 18. Cradle support surface 43 may also be curved to correspond with the curvature of a desired workpiece.

A plurality of positioning holes 19 are arranged vertically along the surface of vertical support plate 18 to correspond with positioning slots 38A on cradle 38. The positioning holes 19 and slots 38A allow cradle 38 to be placed at a desired position on the vertical support plate 18 to support a workpiece to be machined. Bolts, screws, or pins positioned in holes 19 and slots 38A may be used to hold or clamp cradle 38 in a desired position on vertical support plate 18. Other supporting means such as a clamping mechanism could also be utilized. Side arms 20 are pivotally affixed to vertical slides 16 by arm pivots 25. An articular 35 is attached to each side arm 20 to selectively pivot each side arms 20 on arm pivots 25 to engage and hold a workpiece in place. The articular 35 is attached to each side arm 20 by an anchor 26 affixed to the vertical support plate 18. A lock down pivot 32 extends from anchor 26 to rotatably engage a lock down receiver 29. A lock down bolt 30 fed through lock down receiver 29 and attached to the side arm 20 by bolt hinge 28. Extension and retraction of lock bolt 30 with respect to lock down receiver 29 articulates side arm 20 inward and outward.

Lock down bolt 30 may be a threaded bolt as shown or a piston, or other extending and retracting means for articulating side arms 20 into and out of engagement with a workpiece. When lock down bolt 30 is threaded, rotation of lock down receiver 29 by lock down handles 34 will move lock down bolt 30 inward and outward to pivot the side arm 20.

Lock down bolt 30 may have an eyelet end 30a engaged with bolt hinge 28. Bolt hinge 28 is attached side arm 20 by pivot pin 28a to allow pivotal pressure to be applied towards and away from the surface of a workpiece as lock down bolt 30 is articulated inward and outward by lock down receiver 29. Eyelet end 30a grips bolt hinge 28 so that extension and retraction of lock bolt 30 with respect to lock down receiver 29 and articulates side arm 20 inward and outward. When lock down receiver 29 is a threaded receiver, the articulation of lock down receiver 29 by handles 34 will drive lock down bolt 30 downward to hingedly move side arms 20 inward and outward. When lock down receiver 29 is a hydraulic or pneumatic cylinder (not shown) injection of hydraulic or pneumatic pressure will drive lock down bolt 30 downward to hingedly move side arms 20 inward and outward.

Side arms 20 and cradle 38 have contact rollers 21 to allow a workpiece to be rotated around its longitudinal axis while preventing the workpiece from moving axially. Contact rollers 21 on a roller axle 23 are affixed to the ends of side arms 20. Cradle 38 comprises a plurality of cradle holes 17 for attachment of a desired number of contact rollers 21. Contact rollers 21 are affixed to allow the longitudinal rotation of a workpiece within the steady rest 10 without the need to release the gripping pressure of side arms 20. Contact rollers 21 affixed to cradle 38 protrude slightly above curved support surface 43 of cradle 38 to allow the rollers 21 to support a workpiece above the surface of cradle 38 to allow the workpiece to be rotated upon contact rollers 21.

When milling or machining a large workpiece which may require added support to keep a workpiece stable, side arms 20 will hold the workpiece supported on vertical support plate 18 and curved seat 14. When milling or machining a smaller workpiece which may require minimal support to remain stable, side arms 20 will hold the workpiece supported against cradle 38.

While a workpiece will typically react or shift under the pressure exerted by a typical machining tool, contact rollers 21 mounted on side arms 20 and cradle 38 create a distributed contact with the surface of a workpiece keeping, the workpiece fixed in place where it will not react to or shift due to the pressure created by a milling or machining tool during, operations.

Figure 3:
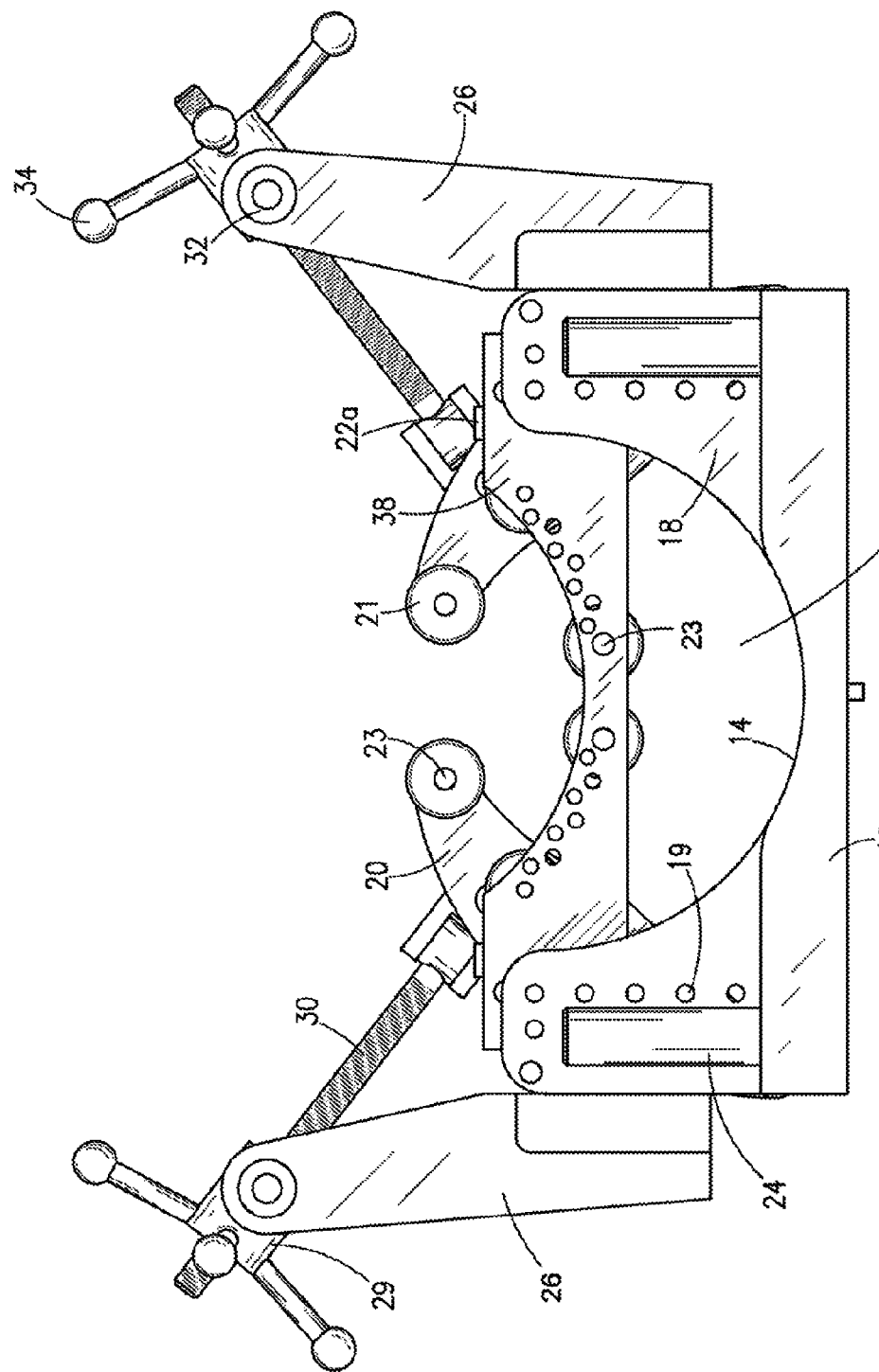
FIG. 3 is a front elevation view of the through cutting mill steady rest as shown in FIG. 1 depicting the cradle fixed in an elevated position.
Figure 4:
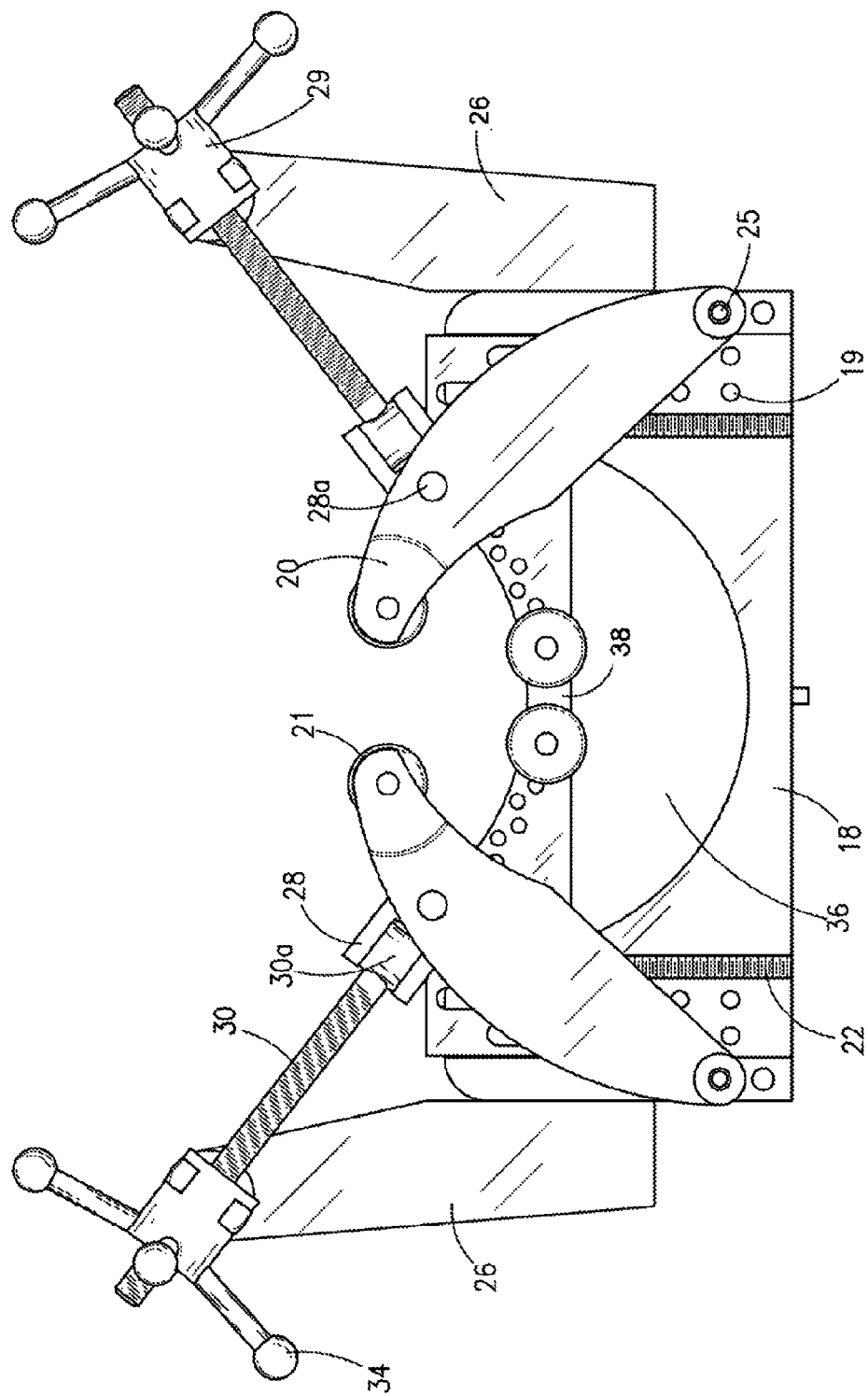
FIG. 4 is a rear elevation view of the through cutting mill steady rest as shown in FIG. 4 depicting the arms in a closed workpiece gripping position.

As shown in FIGS. 3 and 4, threaded lifting rods 22 are engaged through threaded lifting rod bore holes 22h in cradle 38. Rotation of the lifting rods will raise or lower the cradle 38 along lifting rods 22 to a desired height relative to vertical support plate 18. The cradle 38 may also be raised or lowered by hydraulic, pneumatic, or any other suitable lifting mechanism. When lifting rods 22 are threaded, rotation of lifting rod head 22a will threadedly engage lifting rods 22 into and out of cradle 38 to raise or lower cradle 38. Positioning holes 19 allow cradle 38 to be fixed or clamped to vertical support plate 18 at a desired height. The adjustable cradle 38 and side arms 20 allow the size of workpiece aperture 36 to be adjusted to fit a desired workpiece and allows for a fixed gripping of a workpiece to prevent shifting during machining.

Figure 5:
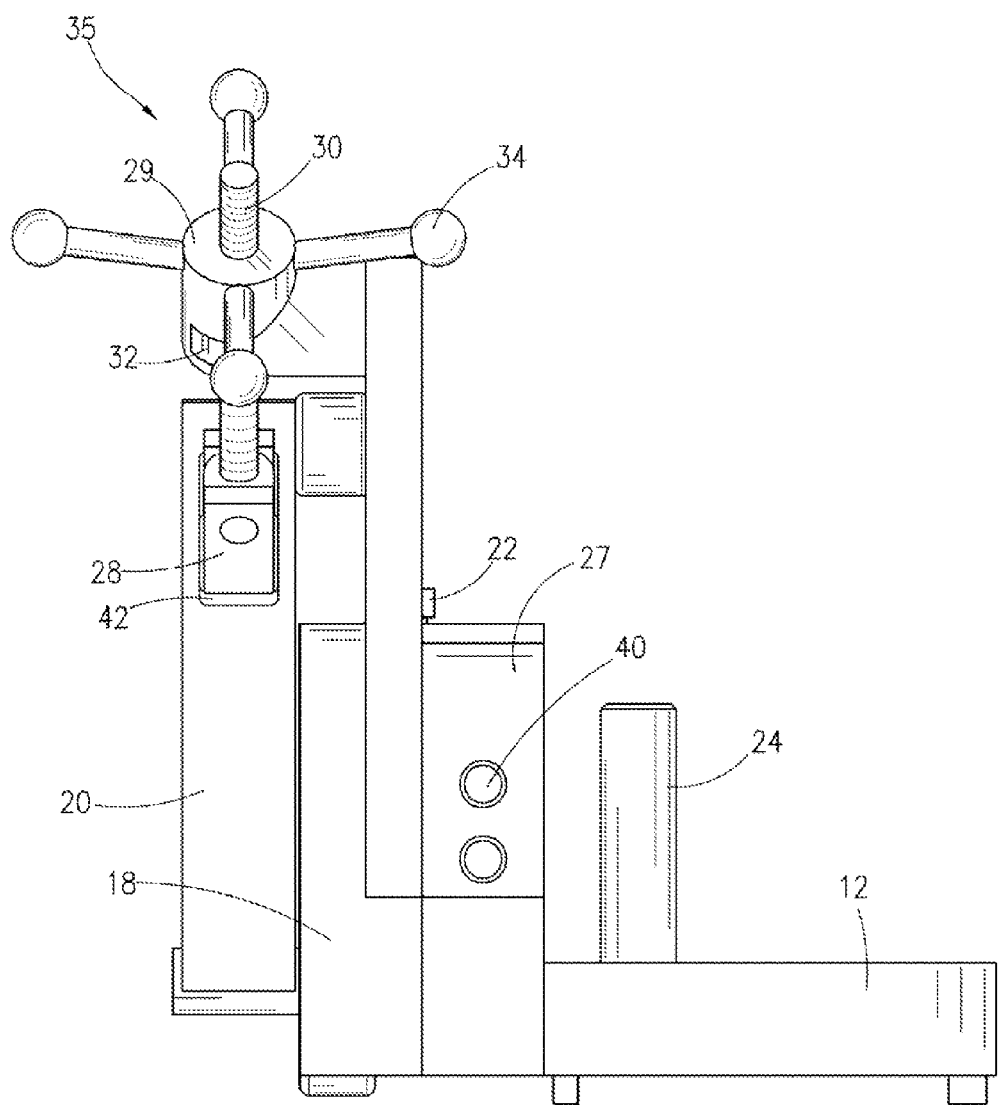
FIG. 5 is a side elevation view of the through cutting mill steady rest as shown in FIG. 1.

Best seen in FIG. 5, Anchors 26 are affixed to vertical support plate 18 by anchor bolts 40 to provide leverage for arm articulator 35 to deliver clamping pressure upon a desired workpiece by side arms 20. Anchor bolts 40 allow for a fixed hold of anchors 26 to vertical support plate 18.

Figure 6:
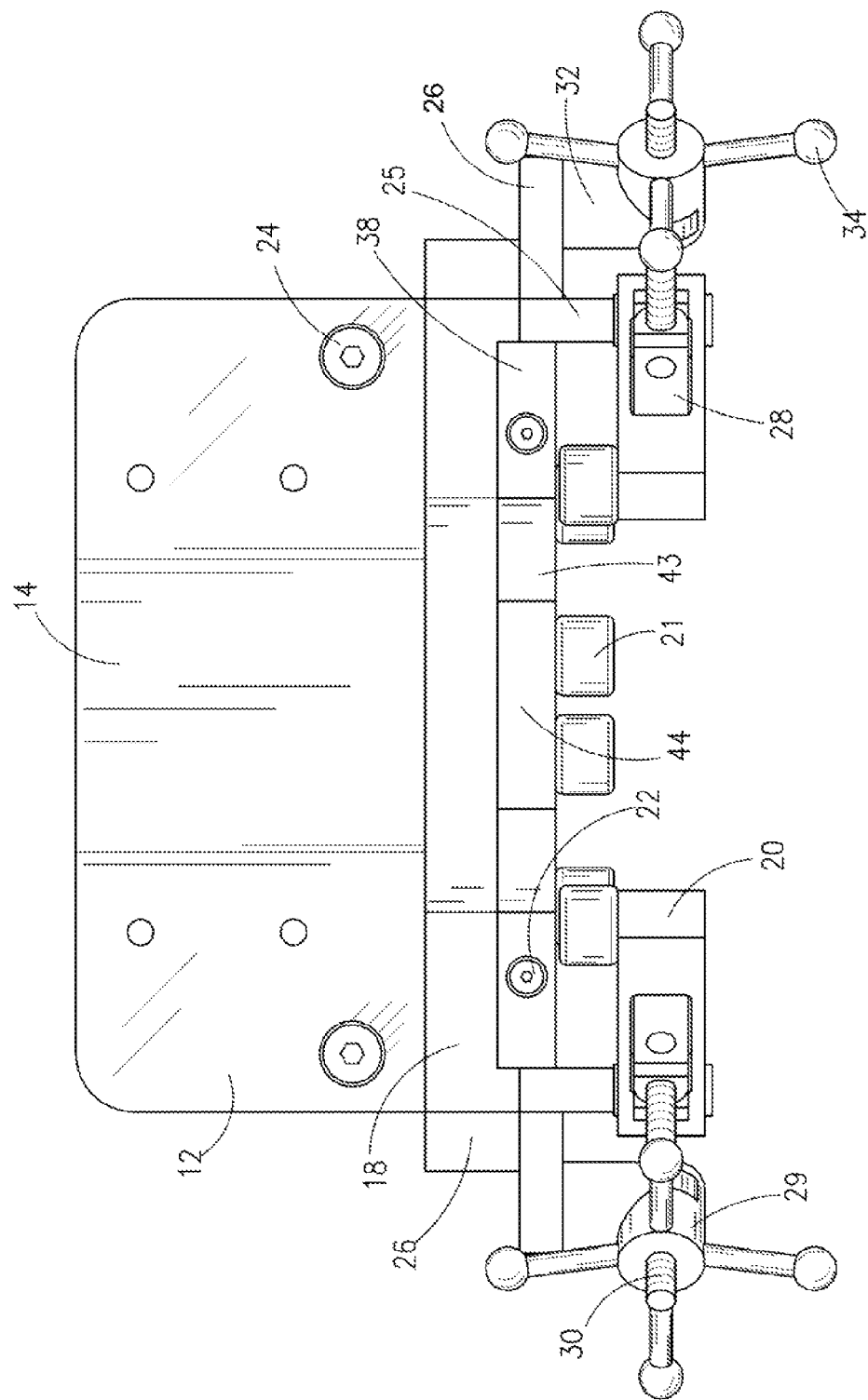
FIG. 6 is a top view of the through cutting mill steady rest as shown in FIG. 1.

As shown in FIGS. 5 and 6, as the lock down bolt 30 is moved in or out of lock down receiver 29, the inward or outward pressure upon arms 20 will rotate the arm articulating means 35 up and down. Lock down pivot 32 will retain the relative position of lock down receiver 29 and lock down bolt 30 relative to anchors 26 and 27 while arms 20 will move towards and away from a workpiece. As arms 20 are moved towards and away from a workpiece by articulation of lock down receiver 29 upon lock down bolt 30, bolt hinge 28 will hingedly move up or down within hinge receptacle 42 on side arms 20.

The curved support surface 43 on cradle 38 supports a workpiece during machining. A machining, gap 44 comprising a small dip in the center of the support surface 43 may be added to the support surface 43 to minimize the risk of damage to the steady rest 10 when it is necessary to machine completely through a workpiece.

Steady rest 10 may be equipped with attachment bars 24 to provide a means of lifting, transporting, and removing or attaching steady rest 10 to a work table or support platform on a milling machine. Attachment bars 24 may further be used in fastening steady rest 10 to a milling machine in a vertical or horizontal orientation for milling, machining, and drilling a desired workpiece.

Figure 7:
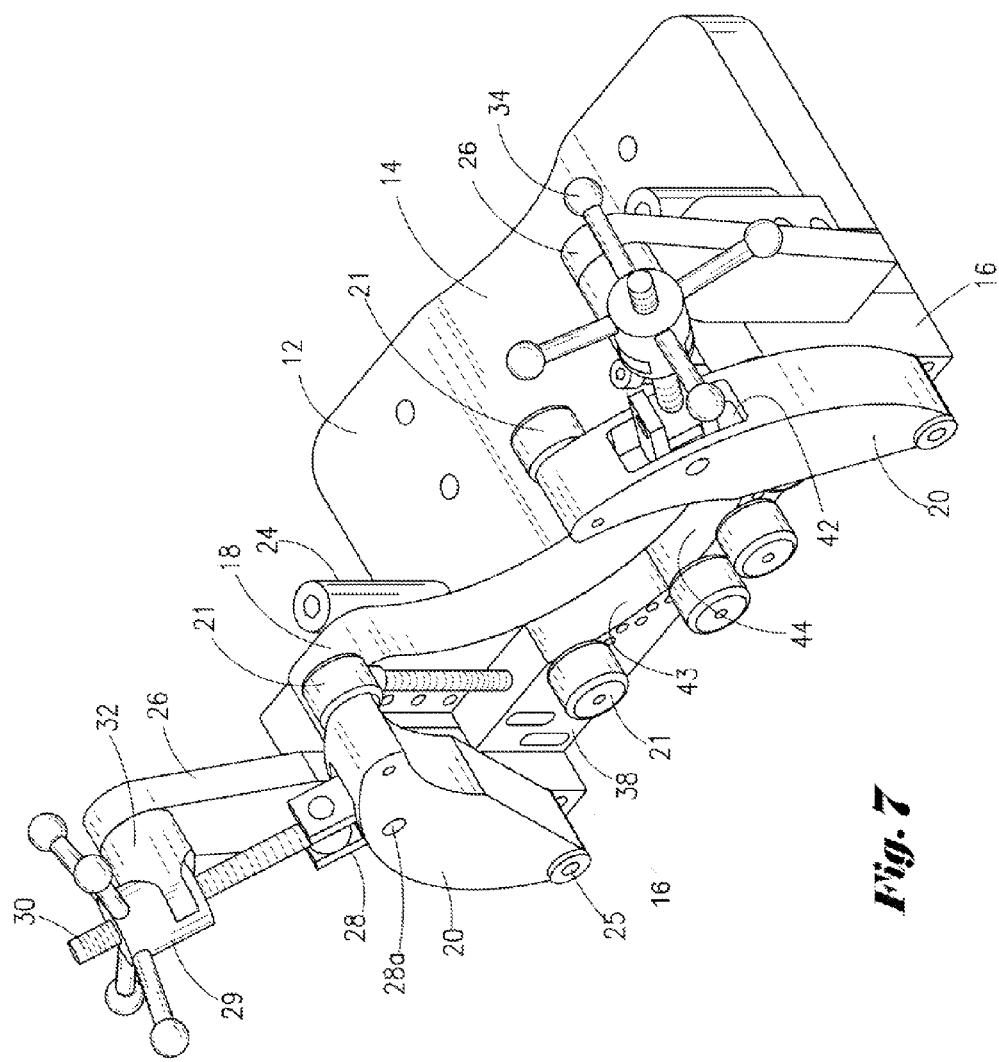
FIG. 7 is a perspective view of the through cutting mill steady rest shown in FIG. 1.

Now referring to FIG. 7, in use a workpiece may be placed within workpiece aperture 36 upon the contact rollers of cradle 38. The workpiece may then be secured to the support cradle by pivoting the support arms 20 inwardly to engage the workpiece. As depicted the support arms may be pivoted inwardly by rotating lock, down receiver 29 upon lock down bolt 30 by rotation of handles 34 of articulator 35. Contact rollers 21 of side arms 20 will conic in contact with it workpiece to prevent lateral movement of the workpiece while being machined. When side arms 20 are engaged on the surface of a workpiece, a gap is created upon the upper surface of the workpiece wherein a milling or machining tool may cut between side arms 20 without the need to release side arms 20 from the workpiece. Further, while a workpiece is in gripping arrangement with the steady rest 10, contact rollers 21 of side arms 20 and cradle 38 allow for the rotation of the workpiece around its longitudinal axis without the need to release the workpiece from the steady rest for repositioning. Upon completion of milling or machining of a desired surface of a workpiece, the workpiece may then be rotated around its longitudinal axis wherein the milling or machining may continue upon a new desired surface without the need to release the workpiece from gripping arrangement.

It is thought that the through-cutting mill steady rest presented herein as well as its attendant advantages will be understood from the foregoing description. It is also thought that it will be apparent that various changes may be made in the form, construction, and arrangement of the parts thereof without departing from the spirit and scope of the invention or sacrificing all of its material advantages, the form herein being merely an example embodiment of the invention.

I claim:

1. A workpiece steady rest apparatus comprising:
   a) a baseplate;
   b) a vertical support plate having a curved workpiece support surface;
   c) a cradle having an upper surface corresponding to said curved workpiece support surface, said cradle adjustably attached to said vertical support plate whereby said cradle may be adjustably positioned with respect to said base plate;
   d) anchor support surfaces mounted to said vertical support plate;
   e) a pair of opposing side arms each having a pivot end and a workpiece engaging end, said pivot end of each said side arm pivotally attached to said vertical support plate, said side arms being articulable as desired to adjustably engage a workpiece between said opposing side arm;
   f) a workpiece support roller attached to said workpiece engaging end of said each side arm and a plurality of work piece support rollers attached to said cradle to extend above said upper surface of said cradle for grippingly engaging said workpiece; and
   g) a clamp whereby said rollers of side arms may be fixed to create clamping force upon said workpiece.

2. The workpiece steady rest of claim 1, wherein said side arms and said cradle are positionable to create an opening around a workpiece having a gap where a tool may be positioned to machine said workpiece between said side arms.

3. The workpiece steady rest of claim 2, further comprising:
   (a) an anchor attached to said vertical support plate supporting said clamp; and
   (b) wherein said clamp is adjustably attached to said anchor to allow clamping pressure by said rollers of side arms to be directed at a downward angle upon said workpiece.

4. The workpiece steady rest of claim 3, wherein said upper surface of said cradle has an additional curve whereby a gap is created between said upper surface of said cradle and said workpiece.

5. The workpiece steady rest of claim 4, wherein:
   (a) said side arms and said cradle restrict lateral and longitudinal movement of said workpiece; and
   (b) wherein said rollers on said support arms and said plurality of rollers on said cradle allow rotation of said workpiece around its longitudinal axis.

6. The workpiece steady rest of claim 5, further comprising attachment bars fixedly attached to said base plate.

7. The workpiece steady rest of claim 6, wherein said clamp is a threaded bolt and receiver assembly.

8. The workpiece steady rest of claim 6, wherein said clamp is a hydraulic assembly.

9. The workpiece steady rest of claim 6, wherein said clamp is a pneumatic assembly.

10. A workpiece steady rest apparatus comprising:
    a) a baseplate;
    b) a vertical support plate having a curved workpiece support surface;
    c) a cradle having an upper surface corresponding to said curved workpiece support surface, said cradle having a vertically oriented threaded bore;
    d) a lifting rod threadedly attached to said threaded bore of said cradle to bear upon said base plate whereby the height of said cradle may be threadedly adjusted with respect to said base plate;
    e) opposing, side arms each having a pivot end and a workpiece engaging end, said pivot end of said side arms pivotally attached to said vertical support plate, said side arms being articulable to engage said workpiece engaging end with a workpiece; and
    f) workpiece-contacting rollers attached to said workpiece engaging end of said side arms and said upper surface of said cradle for grippingly engaging said workpiece.

11. The workpiece steady rest of claim 10, further comprising a clamp pivotally attached to said opposing side arms whereby a clamping pressure may be imparted by said opposing side arms on said workpiece and whereby said side arms when in clamping engagement with said workpiece create a gap where a tool may be positioned to machine said workpiece between said side arms.

12. The workpiece steady rest of claim 11, wherein said upper surface of said cradle has an additional curve whereby a gap is created between said upper surface of said cradle and said workpiece.

13. The workpiece steady rest of claim 12, wherein said clamp is pivotally attached to an anchor attached to said vertical support.

14. The workpiece steady rest of claim 13, wherein said anchor attached to said vertical support plate and said clamp are positioned to allow clamping pressure to be directed at a downward angle upon said workpiece.

15. The workpiece steady rest of claim 14, wherein:
    (a) said side arms and said cradle restrict lateral and longitudinal movement of said workpiece; and
    (b) wherein said plurality of rollers allow rotation of said workpiece around its longitudinal axis.

16. The workpiece steady rest of claim 15, further comprising attachment bars whereby said base plate is mounted to a milling machine.

17. The workpiece steady rest of claim 16, wherein said clamp is a threaded bolt and receiver assembly.

* * * * *